(12) United States Patent
Tanaka et al.

(10) Patent No.: US 11,143,082 B2
(45) Date of Patent: Oct. 12, 2021

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Shogo Tanaka, Toki (JP); Norihisa Nakagawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 16/534,121

(22) Filed: Aug. 7, 2019

(65) Prior Publication Data

US 2020/0072114 A1 Mar. 5, 2020

(30) Foreign Application Priority Data

Aug. 30, 2018 (JP) .............................. JP2018-161357

(51) Int. Cl.
*F01N 3/08* (2006.01)
*F01N 11/00* (2006.01)

(52) U.S. Cl.
CPC .......... *F01N 11/002* (2013.01); *F01N 3/0814* (2013.01); *F01N 3/0864* (2013.01); *F01N 11/007* (2013.01); *F01N 2230/02* (2013.01); *F01N 2900/0601* (2013.01)

(58) Field of Classification Search
CPC .... F01N 11/002; F01N 3/0814; F01N 11/007; F01N 3/0864; F01N 2900/0601; F01N 2230/02
See application file for complete search history.

(56) References Cited

U.S. PATENT DOCUMENTS

| 10,001,047 | B2* | 6/2018 | Norris | F01N 3/2066 |
| 2007/0006577 | A1 | 1/2007 | Yokoyama et al. | |
| 2007/0144151 | A1* | 6/2007 | Lueders | F01N 11/002 60/286 |
| 2014/0116034 | A1* | 5/2014 | Otsuki | B01D 46/2418 60/297 |
| 2014/0230415 | A1* | 8/2014 | Shimode | B01D 53/9477 60/286 |
| 2015/0086426 | A1* | 3/2015 | DeGeorge | F01N 13/009 422/108 |

(Continued)

FOREIGN PATENT DOCUMENTS

JP 2007-016684 A 1/2007

*Primary Examiner* — Matthew T Largi
(74) *Attorney, Agent, or Firm* — Oliff PLC

(57) ABSTRACT

An exhaust purification system of the internal combustion engine, is provided with: an exhaust purification catalyst having a catalytic function; a particulate filter arranged at a downstream side from the exhaust purification catalyst; an oxygen feed device feeding gas containing oxygen into exhaust gas flowing into the particulate filter; a detection device detecting a concentration of ammonia in exhaust gas flowing out from the particulate filter; and a control device. The control device controls the oxygen feed device so as to feed oxygen from the oxygen feed device to the particulate filter if a temperature of the exhaust purification catalyst is equal to or greater than an activation temperature and an air-fuel ratio of exhaust gas is a rich air-fuel ratio, and estimates the amount of deposition of particulate matter on the particulate filter based on the output of the detection device when feeding oxygen.

8 Claims, 11 Drawing Sheets

(56) References Cited

U.S. PATENT DOCUMENTS

| | | | |
|---|---|---|---|
| 2017/0204763 A1* | 7/2017 | Nishioka | F01N 3/208 |
| 2018/0030918 A1* | 2/2018 | Gwidt | F01N 11/005 |
| 2018/0202337 A1* | 7/2018 | Khaled | F01N 11/00 |
| 2020/0224573 A1* | 7/2020 | Williges | F01N 3/101 |

* cited by examiner

EXHAUST PURIFICATION SYSTEM OF INTERNAL COMBUSTION ENGINE

FIELD

The present invention relates to an exhaust purification system of an internal combustion engine.

BACKGROUND

To trap particulate matter (below, also referred to as "PM") exhausted from an internal combustion engine, it is known to provide a particulate filter (below, also simply referred to as a "filter") in an exhaust passage of the internal combustion engine (for example, PTL 1). In such a filter, if the PM trapped by the filter and deposited on the filter becomes greater, the pressure loss at the filter increases and thus an output of the internal combustion engine is decreased and the combustion is deteriorated.

Therefore, it is known to estimate the amount of deposition of PM on the filter and, when the estimated amount of deposition of PM is great, raise the filter to a high temperature to burn off the PM as processing to regenerate the filter. The amount of deposition of PM is estimated based on a differential pressure between forward and backward of the filter since, for example, the greater the amount of deposition of PM on the filter, the greater the pressure loss at the filter becomes.

In particular, the device described in PTL 1 estimates the ability of the filter to effectively trap PM based on the estimated value of the amount of deposition of ash on the filter, and estimates the amount of deposition of PM on the filter based on the estimated ability and the differential pressure between forward and backward of the filter. Due to this, it is considered that, even if ash deposits on the filter, it is possible to accurately estimate the amount of deposition of PM on the filter.

CITATION LIST

Patent Literature

[PTL 1] Japanese Unexamined Patent Publication No. 2007-016684

SUMMARY

Technical Problem

In this regard, the differential pressure between forward and backward of a filter changes depending also on the flow rate of the exhaust gas. For this reason, if the operating state of the internal combustion engine changes and thus the flow rate of the exhaust gas changes, the accuracy of estimation of the amount of deposition of PM on the filter based on the differential pressure between forward and backward of the filter is not that high. In addition, when the flow rate of the exhaust gas is small, the differential pressure between forward and backward of the filter is not that great, therefore estimation error easily arises in the amount of deposition of PM. Therefore, if estimating the amount of deposition of PM based on the differential pressure between forward and backward of the filter, the accuracy of estimation is not that high. A method of estimation of the amount of deposition of PM by another technique not based on the differential pressure between forward and backward of the filter is considered necessary.

In consideration of the above problem, an object of the present disclosure is to provide an exhaust purification system able to estimate the amount of deposition of particulate matter by a new technique.

Solution to Problem

The present invention was made so as to solve the above problem and has as its gist the following.

(1) An exhaust purification system of the internal combustion engine, comprising:
  an exhaust purification catalyst arranged in an exhaust passage of the internal combustion engine and having a catalytic function;
  a particulate filter arranged in the exhaust passage at a downstream side from the exhaust purification catalyst in the direction of flow of exhaust;
  an oxygen feed device feeding gas containing oxygen into exhaust gas flowing into the particulate filter at a downstream side from the exhaust purification catalyst in the direction of flow of exhaust;
  a detection device changing in output according to a concentration of ammonia in exhaust gas flowing out from the particulate filter; and
  a control device controlling the oxygen feed device and estimating an amount of deposition of particulate matter on the particulate filter,
  wherein the control device is configured to control the oxygen feed device so as to continuously or intermittently feed oxygen from the oxygen feed device to the particulate filter if a temperature of the exhaust purification catalyst is in a predetermined temperature range of equal to or greater than an activation temperature and an air-fuel ratio of exhaust gas discharged from a body of the internal combustion engine is a rich air-fuel ratio richer than a stoichiometric air-fuel ratio, and estimate the amount of deposition of particulate matter on the particulate filter based on the output of the detection device when feeding oxygen.

(2) The exhaust purification system of the internal combustion engine according to above (1), wherein the predetermined temperature range is 400° C. to 600° C.

(3) An exhaust purification system of the internal combustion engine, comprising:
  an exhaust purification catalyst arranged in an exhaust passage of the internal combustion engine and having a catalytic function;
  a particulate filter arranged in the exhaust passage at a downstream side from the exhaust purification catalyst in the direction of flow of exhaust;
  an oxygen feed device feeding gas containing oxygen into exhaust gas flowing into the particulate filter at a downstream side from the exhaust purification catalyst in the direction of flow of exhaust;
  a detection device changing in output according to a concentration of ammonia in exhaust gas flowing out from the particulate filter; and
  a control device controlling the oxygen feed device and estimating an amount of deposition of particulate matter on the particulate filter,
  wherein the control device is configured to control the oxygen feed device so as to continuously or intermittently feed oxygen from the oxygen feed device to the particulate filter under conditions in which, when an air-fuel ratio of exhaust gas exhausted from a body of the internal combustion engine is a rich air-fuel ratio richer than a stoichiometric air-fuel ratio, hydrogen or ammonia is generated at the exhaust purification catalyst, and estimate the amount of deposition of particulate matter on the particulate filter based on the output of the detection device when feeding oxygen.

(4) The exhaust purification system of the internal combustion engine according to any one of above (1) to (3), wherein the control device makes the oxygen feed device feed air so that the time average air-fuel ratio of exhaust gas flowing into the particulate filter is the stoichiometric air-fuel ratio, when estimating the amount of deposition of particulate matter on the particulate filter.

(5) The exhaust purification system of the internal combustion engine according to any one of above (1) to (4), wherein the control device makes the oxygen feed device continuously feed oxygen so that the average air-fuel ratio of exhaust gas flowing into the particulate filter is continuously the stoichiometric air-fuel ratio, when estimating the amount of deposition of particulate matter on the particulate filter.

(6) The exhaust purification system of the internal combustion engine according to any one of above (1) to (5), wherein the control device makes the oxygen feed device feed air in the exhaust gas so that the air-fuel ratio of the exhaust gas flowing into the particulate filter alternately changes between a rich air-fuel ratio and a lean air-fuel ratio leaner than a stoichiometric air-fuel ratio and so that the average air-fuel ratio over time of exhaust gas flowing into the particulate filter is the stoichiometric air-fuel ratio, when estimating the amount of deposition of particulate matter on the particulate filter.

(7) The exhaust purification system of the internal combustion engine according to any one of above (1) to (6), wherein the detection device a NOx sensor detecting NOx in the exhaust gas, which is configured to change in output in accordance with a concentration of NOx as well as a concentration of ammonia in the exhaust gas.

(8) The exhaust purification system of the internal combustion engine according to any one of above (1) to (7), wherein the control device removes particulate matter deposited on the particulate filter as processing for regenerating the filter, when the amount of deposition of particulate matter on the particulate filter is equal to or greater than a predetermined amount.

Advantageous Effects of Invention

According to the present invention, an exhaust purification system able to estimate the amount of deposition of particulate matter by a new technique is provided.

DESCRIPTION OF EMBODIMENT

Figure 1:
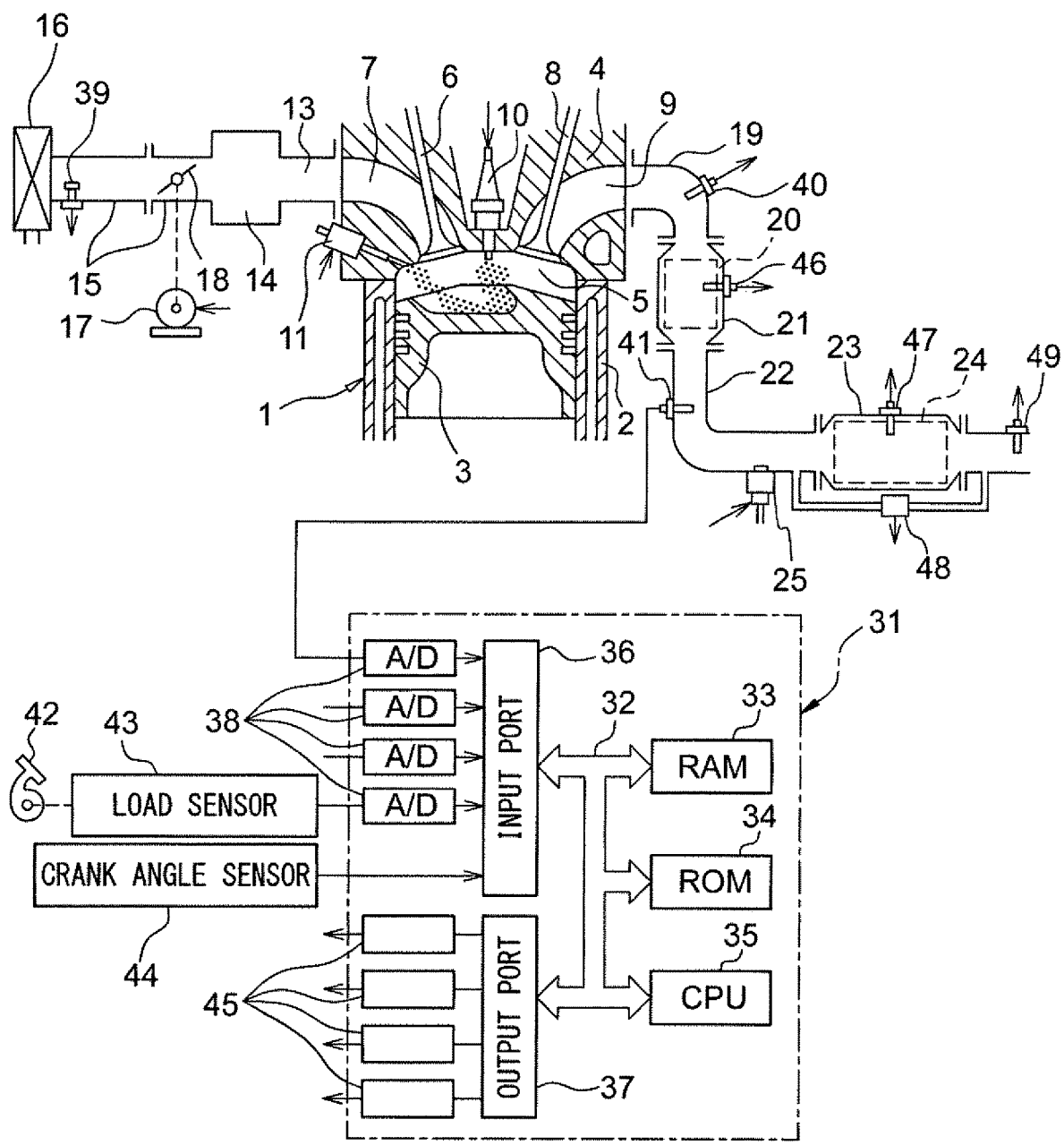
FIG. 1 is a view schematically showing an internal combustion engine in which an exhaust purification system according to one embodiment is used.

Below, referring to the drawings, embodiments of the present invention will be explained in detail. Note that, in the following explanation, similar component elements are assigned the same reference numerals.

First Embodiment

<<Explanation of Internal Combustion Engine as a Whole>>

FIG. 1 is a view which schematically shows an internal combustion engine in which an exhaust purification system according to a first embodiment of the present invention is used. Referring to FIG. 1, 1 indicates an engine body, 2 a cylinder block, 3 a piston which reciprocates in the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, gasoline with a stoichiometric air-fuel ratio of 14.6, is used as the fuel. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 is connected to an upstream side casing 21 which houses an exhaust purification catalyst 20. The upstream side casing 21 is connected through an exhaust pipe 22 to a downstream side casing 23 which houses a particulate filter (below, also referred to as a "filter") 24. Between the exhaust purification catalyst 20 and the filter 24, a secondary air feed device 25 is provided for feeding secondary air into the exhaust gas flowing through the exhaust pipe 22, i.e. into the exhaust gas flowing into the filter 24. The exhaust port 9, exhaust manifold 19, upstream side casing 21, exhaust pipe 22, and downstream side casing 23 form an exhaust passage.

Note that the exhaust purification system of the present embodiment has the secondary air feed device 25, but may have another type of oxygen feed device as long as the device can feed a gas containing oxygen into the exhaust gas flowing into the filter 24. Such an oxygen feed device includes, for example, a device for feeding only oxygen into the exhaust gas.

The electronic control unit (ECU) 31 is comprised of a digital computer which is provided with components such as a RAM (random access memory) 33, ROM (read only memory) 34, CPU (microprocessor) 35, input port 36, and output port 37, which are connected together through a bidirectional bus 32.

In the intake pipe 15, an air flow meter 39 is arranged for detecting the flow rate of air which flows through the intake pipe 15. The output of this air flow meter 39 is input through a corresponding AD converter 38 to the input port 36. Further, at the exhaust manifold 19, an upstream side air-fuel ratio sensor 40 is arranged which detects the air-fuel ratio of the exhaust gas which flows through the exhaust manifold 19 (that is, the exhaust gas which flows into the exhaust purification catalyst 20). In addition, in the exhaust pipe 22, a downstream side air-fuel ratio sensor 41 is arranged which detects the air-fuel ratio of the exhaust gas which flows through the exhaust pipe 22 (that is, the exhaust gas which flows out from the exhaust purification catalyst 20 and flows into the filter 24). The outputs of these air-fuel ratio sensors 40 and 41 are also input through the corresponding AD converters 38 to the input port 36.

Further, the exhaust purification catalyst 20 is provided with a catalyst temperature sensor 46 for detecting the temperature of the exhaust purification catalyst 20. Moreover, the filter 24 is provided with a filter temperature sensor 47 for detecting the temperature of the filter 24. Further, in the exhaust pipe 22 at the upstream side and downstream side of the filter 24, a differential pressure sensor 48 is provided for detecting the differential pressure between forward and backward of the filter 24. In addition, the exhaust pipe 22 at the downstream side of the filter 24 is provided with an NOx sensor 49 for detecting the concentration of NOx in the exhaust gas flowing out from the filter 24. The outputs of these temperature sensors 46, 47, differential pressure sensor 48, and NOx sensor 49 are also input through corresponding AD converters 38 to the input port 36.

Further, a load sensor 43 generating an output voltage proportional to the amount of depression of the accelerator pedal 42 is connected to the accelerator pedal 42. The output voltage of the load sensor 43 is input through a corresponding AD converter 38 to the input port 36. The crank angle sensor 44, for example, generates an output pulse every time the crank shaft rotates by 15 degrees. This output pulse is input to the input port 36. At the CPU 35, the engine speed is calculated from the output pulse of this crank angle sensor 44.

On the other hand, the output port 37 is connected through corresponding drive circuits 45 to the spark plugs 10, fuel injectors 11, throttle valve drive actuator 17 and secondary air feed device 25. Therefore, the ECU 31 functions as a control device for controlling the operations of the spark plugs 10, fuel injectors 11, throttle valve drive actuator 17 and secondary air feed device 25.

The exhaust purification catalyst 20 is a three-way catalyst which comprises a carrier made of ceramic on which a precious metal (for example, platinum Pt) having a catalyst effect. A three-way catalyst has the function of simultaneously purifying unburned HC, CO and NOx when the air-fuel ratio of the exhaust gas flowing into the three-way catalyst is maintained at the stoichiometric air-fuel ratio. Note that as long as carrying a substance having catalytic function, the exhaust purification catalyst 20 may be a catalyst other than the three-way catalyst, such as oxidation catalyst or NOx storage reduction catalyst.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 is somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and NOx are simultaneously purified. At this time, the air-fuel ratio of the exhaust gas flowing out from the exhaust purification catalysts 20 and 24 is the stoichiometric air-fuel ratio.

Figure 2A:
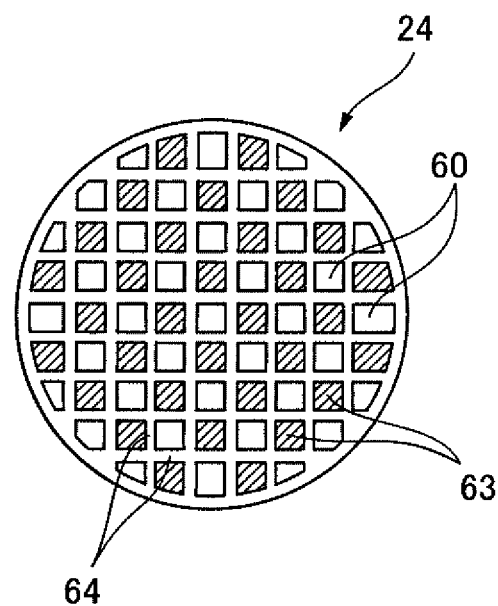
FIGS. 2A and 2B are views showing the structure of a filter.
Figure 2B:
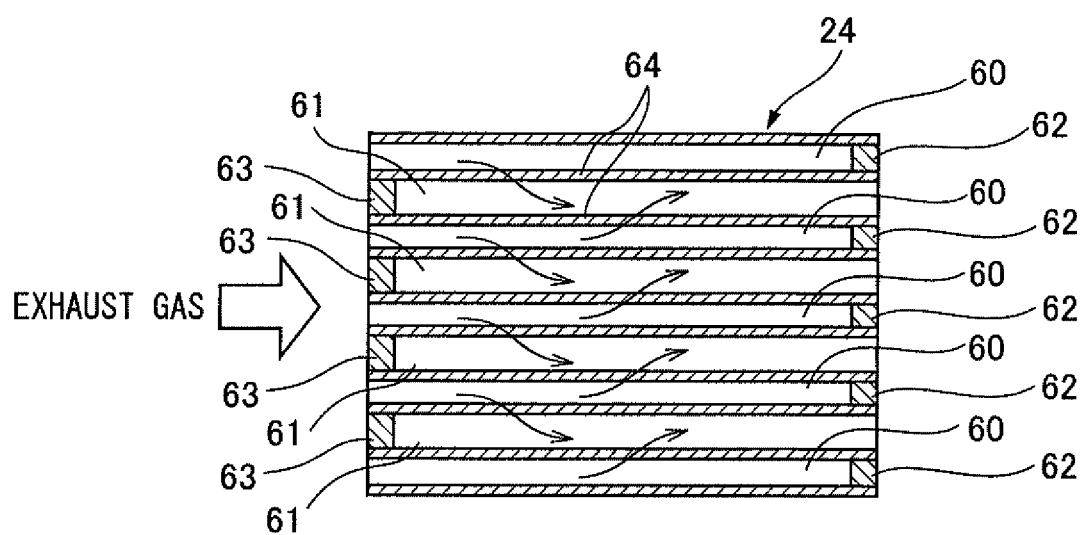

FIGS. 2A and 2B are views showing the structure of the filter 24. FIG. 2A is a front view of the filter 24, while FIG. 2B is a side cross-sectional view of the filter 24. As shown in FIGS. 2A and 2B, the filter 24 forms a honeycomb structure comprised of a plurality of exhaust flow passages 60, 61 extending in parallel to each other. These exhaust flow passages are comprised of exhaust gas inflow passages 60 with downstream ends closed by plugs 62 and exhaust gas outflow passages 61 with upstream ends closed by plugs 63. Note that, in FIG. 2A, the hatched parts show plugs 63. Therefore, the exhaust gas inflow passages 60 and exhaust gas outflow passages 61 are alternately arranged via thin partition walls 64. In other words, the exhaust gas inflow passages 60 and the exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The filter 24 is, for example, formed from a porous material such as cordierite. Therefore, the exhaust gas flowing into the exhaust gas inflow passages 60, as shown in FIG. 2B by the arrows, passes through the surrounding partition walls 64 and flows out into the adjoining exhaust gas outflow passages 61. In this way, while the exhaust gas is flowing through the partition walls 64, the PM contained in the exhaust gas is trapped by the filter 24.

Further, the filter 24 supports a catalyst precious metal having a catalytic action (for example, platinum (Pt)). Therefore, the filter 24 can not only trap PM in the exhaust gas, but can also oxidize and remove the unburned HC or CO in the exhaust gas. Note that, the filter 24 may be configured otherwise so long as trapping PM in the exhaust gas and supporting a substance having a catalytic action. Further, if arranging an exhaust purification catalyst having a catalytic action between the secondary air feed device 25 and the filter 24, the filter 24 need not support a substance having a catalytic action.

\<\<Processing for Regenerating Filter\>\>

The PM trapped at the filter 24 deposits on the filter 24. If the amount of deposition of PM on the filter 24 increases, the pores in the partition walls 64 are clogged and the pressure loss of the exhaust gas due to the filter 24 becomes greater. The increase of the pressure loss makes output of the internal combustion engine decrease, due to the more difficult flow of the exhaust gas, and makes the combustion deteriorated. Therefore, to prevent a decrease in output of the internal combustion engine or deterioration of the combustion, if the amount of deposition of PM on the filter 24 becomes greater than the limit deposition amount, the PM deposited on the filter 24 has to be oxidized and removed. In this regard, the "limit deposition amount" is the amount such that if the amount of deposition of PM on the filter 24 increases beyond the limit deposition amount, the pressure loss due to the filter 24 will increase and the operating state of the internal combustion engine, etc., will be deteriorated.

Figure 3A:
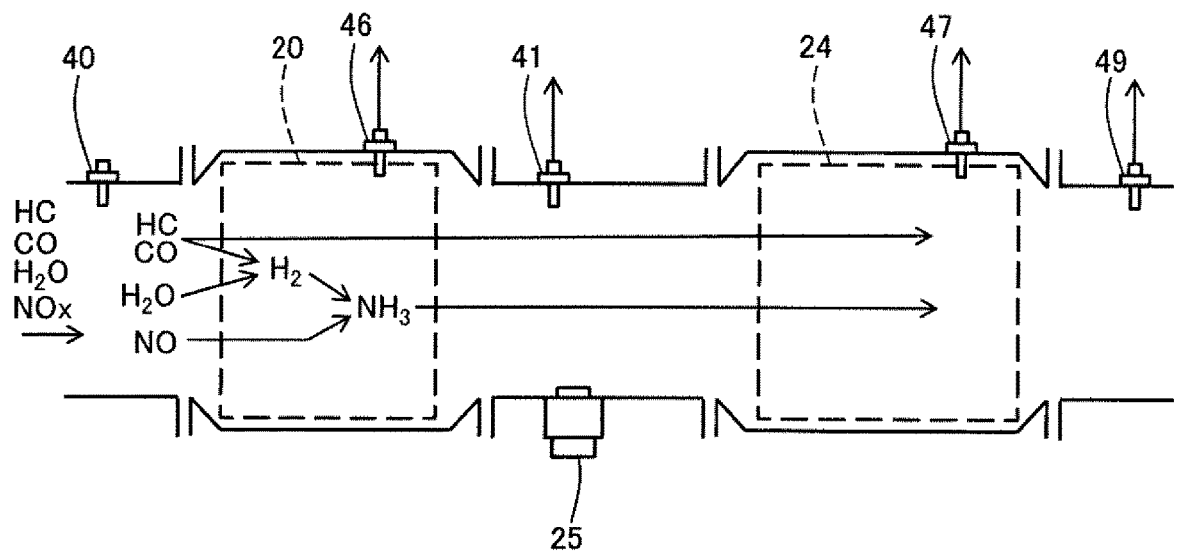
FIGS. 3A and 3B are views schematically showing a reaction occurring in an exhaust purification system when performing the processing for regenerating a filter.
Figure 3B:
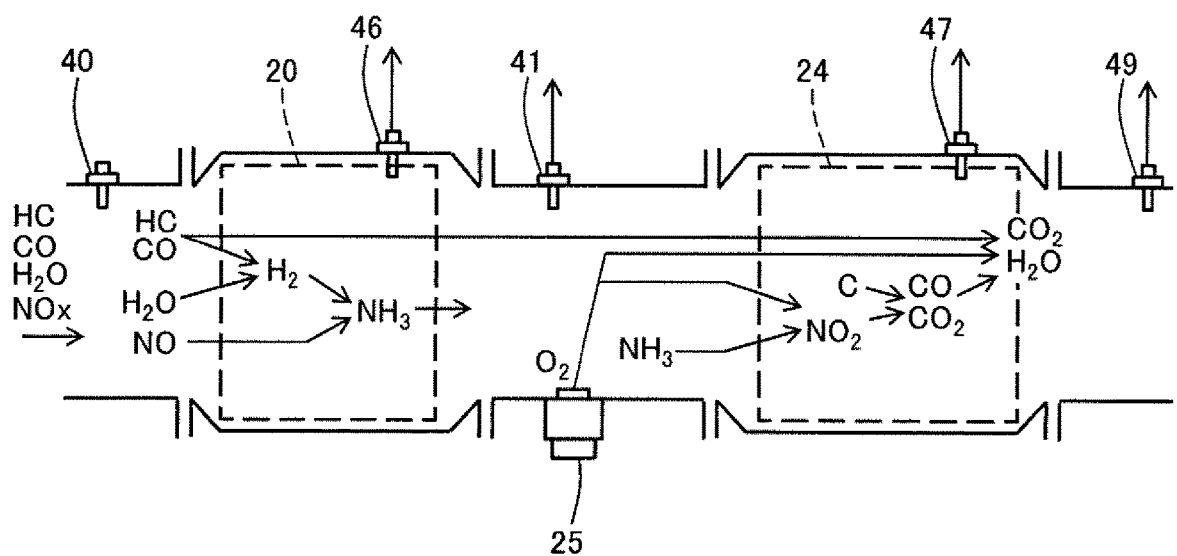

Therefore, in the present embodiment, when the amount of deposition of PM of the filter 24 is great, the processing for regenerating the filter is performed for oxidizing and removing the PM. Below, referring to FIGS. 3A and 3B, the processing for regenerating the filter will be explained. FIGS. 3A and 3B are views schematically showing the reaction occurring in the exhaust purification system when performing the processing for regenerating the filter. In particular, FIG. 3A shows the case where secondary air is not being fed from the secondary air feed device 25, while FIG. 3B shows the case where secondary air is being fed from the secondary air feed device 25.

In performing the processing for regenerating the filter, first, the temperature of the exhaust purification catalyst 20 is raised to equal to or greater than the activation temperature thereof. Similarly, the temperature of the filter 24 is also raised to equal to or greater than the activation temperature thereof. Specifically, the temperatures of the exhaust purification catalyst 20 and the filter 24 are 300° C. to 700° C., preferably 400° C. to 600° C.

In addition, in the present embodiment, in performing the processing for regenerating the filter, the amount of fuel injection from the fuel injector 11 is controlled so that the air-fuel ratio of the exhaust gas exhausted from the engine body 1 is an air-fuel ratio richer than the stoichiometric air-fuel ratio (below, also referred to as the "rich air-fuel ratio"). In other words, in performing the processing for regenerating the filter, the amount of fuel injection is controlled so that the air-fuel ratio of the exhaust gas flowing into the exhaust purification catalyst 20 is the rich air-fuel ratio. As a result, during the processing for regenerating the filter, rich air-fuel ratio exhaust gas flows into the exhaust purification catalyst 20.

In this regard, the rich air-fuel ratio exhaust gas contains unburned HC or CO. In addition, water is generated by the air-fuel mixture burning in the combustion chambers 5, therefore the exhaust gas contains water. Therefore, exhaust gas containing unburned HC and CO and water flows into the exhaust purification catalyst 20.

If the temperature of the exhaust purification catalyst 20 is 300° C. to 500° C., if exhaust gas containing CO and water flows into the exhaust purification catalyst 20, due to the catalytic action of the exhaust purification catalyst 20, a water-gas-shift reaction expressed by the following formula (1) occurs in the exhaust purification catalyst 20:

$$CO + H_2O \rightarrow H_2 + CO_2 \qquad (1)$$

Further, if the temperature of the exhaust purification catalyst 20 is equal to or greater than 500° C., if exhaust gas containing unburned HC and water flows into the exhaust purification catalyst 20, due to the catalytic action of the exhaust purification catalyst 20, a steam reforming reaction such as expressed by the following formula (2) or formula (3) occurs in the exhaust purification catalyst 20:

$$CH_4 + H_2O \rightarrow 3H_2 + CO \qquad (2)$$

$$C_{12}H_{26} + 12H_2O \rightarrow 25H_2 + 12CO \qquad (3)$$

Therefore, when the temperature of the exhaust purification catalyst 20 is equal to or greater than the activation temperature (for example, 300° C.), if rich air-fuel ratio exhaust gas flows into the exhaust purification catalyst 20, hydrogen is generated at the exhaust purification catalyst 20.

Further, even if the air-fuel ratio of the exhaust gas exhausted from the engine body 1 is a rich air-fuel ratio, this exhaust gas contains NOx (mainly NO). The NO contained in the exhaust gas in this way reacts with hydrogen to generate ammonia as shown in the following formula (4) in the exhaust purification catalyst 20 due to the catalytic action of the exhaust purification catalyst 20 when the temperature of the exhaust purification catalyst 20 is a relatively high temperature. Such a reaction particularly easily occurs when the temperature of the exhaust purification catalyst 20 is 400° C. to 600° C.:

$$2NO + 5H_2 \rightarrow 2NH_3 + 2H_2O \qquad (4)$$

Therefore, when the temperature of the exhaust purification catalyst 20 is equal to or greater than the activation temperature (in particular when 400° C. to 600° C.), if a rich air-fuel ratio exhaust gas flows into the exhaust purification catalyst 20, a rich air-fuel ratio exhaust gas containing ammonia flows out from the exhaust purification catalyst 20.

Figure 4:
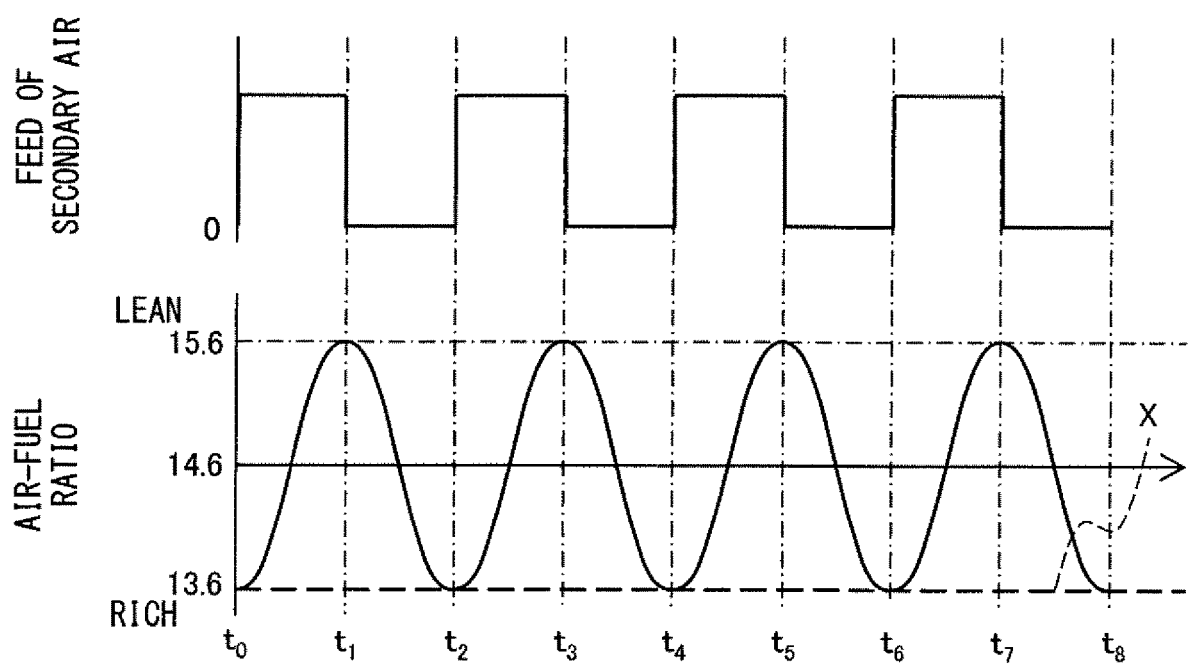
FIG. 4 is a time chart of an amount of feed of secondary air from a secondary air feed device and an air-fuel ratio of exhaust gas flowing into the filter.

In addition, in the present embodiment, in performing the processing for regenerating the filter, secondary air is intermittently (discontinuously) fed from the secondary air feed device 25. FIG. 4 is a time chart of the amount of the feed of secondary air from the secondary air feed device 25 and air-fuel ratio of the exhaust gas flowing into the filter 24. Note that, in FIG. 4, the broken line X shows the air-fuel ratio of the exhaust gas before secondary air is fed (in the illustrated example, the air-fuel ratio at this time is 13.6).

As shown in FIG. 4, in the present embodiment, secondary air is fed intermittently from the secondary air feed device 25. In the example shown in FIG. 4, during the timings $t_0$ to $t_1$, timings $t_2$ to $t_3$, timings $t_4$ to $t_5$, and timings $t_6$ to $t_7$, certain amounts of secondary air are fed. In particular, in the present embodiment, secondary air is intermittently fed so that the time for which the secondary air has been fed (for example, timings $t_0$ to $t_1$) and the time for which the feed of secondary air has been stopped (for example, timings $t_1$ to $t_2$) is equal to each other (below, this time also called "period").

In particular, in the present embodiment, the period of switching the feed of secondary air is set to a time equal to or less than a time for which the lean air-fuel ratio exhaust gas flows into the filter 24 before the rich air-fuel ratio exhaust gas flowing into the filter 24 flows out from the filter 24. Preferably, the period of switching the feed of secondary air is set to a time equal to or less than a time for which the lean air-fuel ratio exhaust gas flows into the filter 24 before the rich air-fuel ratio exhaust gas flowing into the filter 24 reaches the center in the direction of flow of exhaust of the filter 24.

Similarly, the period of switching the feed of secondary air is set to a time equal to or less than a time for which the rich air-fuel ratio exhaust gas flows into the filter 24 before the lean air-fuel ratio exhaust gas flowing into the filter 24 flows out from the filter 24. Preferably, the period of switching the feed of secondary air is set to a time equal to or less than a time for which the rich air-fuel ratio exhaust gas flows into the filter 24 before the rich air-fuel ratio exhaust gas flowing into the filter 24 reaches the center in the direction of flow of exhaust of the filter 24. Specifically, the period of switching the feed of secondary air is, for example, about 10 Hz.

As a result of secondary air being fed from the secondary air feed device 25 in this way, the air-fuel ratio of the exhaust gas flowing into the filter 24, as shown in FIG. 4, alternately changes between the rich air-fuel ratio and an air-fuel ratio leaner than the stoichiometric air-fuel ratio (below, also referred to as the "lean air-fuel ratio"). In particular, in the present embodiment, the secondary air is intermittently fed so that the rich degree when the air-fuel ratio of the exhaust gas flowing into the filter 24 is the richest (for example, the rich degree at the timings $t_0$, $t_2$, $t_4$, etc.) is equal to the lean degree when the air-fuel ratio of the exhaust gas flowing into the filter 24 is the leanest (for example, the lean degree at the timings $t_1$, $t_3$, $t_5$, etc.).

As a result, in the present embodiment, the time average air-fuel ratio of the exhaust gas flowing into the filter 24 over a certain extent of time is substantially the stoichiometric air-fuel ratio. That is, in the present embodiment, the average air-fuel ratio in a plurality of cycles where the air-fuel ratio of the exhaust gas flowing into the filter 24 alternately changes between a rich air-fuel ratio and a lean air-fuel ratio is substantially the stoichiometric air-fuel ratio.

FIG. 3A shows the reaction occurring at the exhaust purification system when secondary air is not fed from the secondary air feed device 25. As will be understood from FIG. 3A, unburned HC, CO contained in the exhaust gas discharged from the engine body 1 flows into the filter 24 and ammonia generated at the exhaust purification catalyst 20 flows into the filter 24.

On the other hand, FIG. 3B shows the reaction occurring at the exhaust purification system if secondary air is being fed from the secondary air feed device 25. At the upstream side from the region where the secondary air feed device 25 is provided, a reaction similar to when secondary air is not being introduced occurs. Therefore, the exhaust gas flowing into the filter 24 includes unburned HC, CO and ammonia. In addition, if secondary air is being fed, the exhaust gas flowing into the filter 24 includes the air, in particular oxygen, fed from the secondary air feed device 25.

If at this time the temperature of the filter 24 is equal to or greater than the activation temperature (for example, 300° C.), on the filter 24 supporting the catalyst precious metal, $NO_2$ is generated from ammonia and oxygen due to the reaction shown in the following formula (5):

$$4NH_3 + 5O_2 \rightarrow 4NO_2 + 6H_2O \qquad (5)$$

The $NO_2$ generated in this way is higher in reactivity with the PM being deposited on the filter 24 than oxygen. Therefore, if the temperature of the filter 24 is about 300° C., the $NO_2$ oxidizes and removes the PM (mainly comprised of carbon C) by the reactions such as shown by the following formulas (6), (7). In addition, if the temperature of the filter 24 is equal to or greater than 550° C. or so, the oxygen in the exhaust gas also oxidizes and removes the PM by the reactions such as shown in the formulas (8), (9):

$$2NO_2 + 2C \rightarrow 2CO_2 + N_2 \qquad (6)$$

$$NO_2 + C \rightarrow CO + NO \qquad (7)$$

$$O_2 + C \rightarrow CO_2 \qquad (8)$$

$$O_2 + 2C \rightarrow 2CO \qquad (9)$$

Further, if the secondary air is being fed, the unburned HC and CO contained in the exhaust gas discharged from the exhaust purification catalyst 20 and the fed oxygen react on the filter 24 and the unburned HC and CO are removed. In the same way, the CO generated by the above formula (7) and formula (9) also is removed by reacting with the fed oxygen.

In this regard, as explained with reference to FIGS. 2A and 2B, in the filter 24, the exhaust gas flows through the thin partition walls 64. Further, in the present embodiment, the air-fuel ratio of the exhaust gas flowing into the filter 24 alternately changes between the rich air-fuel ratio and lean air-fuel ratio at relatively fast cycles. As a result, even if the rich air-fuel ratio exhaust gas and the lean air-fuel ratio exhaust gas alternately flow into the entrance of the filter 24, at the exit of the filter 24, these exhaust gases are mixed together.

As explained above, when secondary air is not being fed, exhaust gas containing unburned HC and CO and ammonia flows into the downstream side part of the filter 24. On the other hand, when secondary air is being fed, exhaust gas containing oxygen flows into the downstream side part of the filter 24. Further, these exhaust gases are mixed together at the downstream side part of the filter 24, therefore the unburned HC and CO and ammonia react with oxygen. As a result, the unburned HC, CO and ammonia are removed.

Due to the above, in the present embodiment, when secondary air is being fed, exhaust gas containing large amounts of $NO_2$ flows into the filter 24, therefore it is possible to promote the removal of PM deposited on the filter 24. In addition, in the present embodiment, rich air-fuel ratio and lean air-fuel ratio exhaust gases alternately flow into the filter 24 by a fast cycle, therefore it is possible to remove the unburned HC, CO, NO, etc. in the exhaust gas and accordingly possible to suppress deterioration of exhaust emissions.

Summarizing the above, in the present embodiment, when the temperature of the exhaust purification catalyst 20 is within a predetermined temperature range of equal to or greater than the activation temperature and the air-fuel ratio of the exhaust gas discharged from the engine body 1 is the rich air-fuel ratio, secondary air (oxygen) is fed from the secondary air feed device 25 into the exhaust gas while cyclically made to increase and decrease so that the air-fuel ratio of the exhaust gas flowing into the filter 24 alternately changes between the rich air-fuel ratio and the lean air-fuel ratio. Further, according to the present embodiment, by controlling the feed of secondary air from the secondary air feed device 25 in this way, it is possible to promote the removal of PM deposited on the filter 24 while suppressing deterioration of the exhaust emission.

<<Estimation of Amount of Deposition>>

In this regard, the processing for regenerating the filter is started when the amount of deposition of PM on the filter 24 becomes equal to or greater than a predetermined limit deposition amount. Further, the processing for regenerating the filter ends when the amount of deposition of PM on the filter 24 becomes equal to or less than a predetermined regeneration end amount (smaller than the limit deposition amount). Therefore, to switch the start and end of the processing for regenerating the filter at a suitable timing, it is necessary to accurately estimate the amount of deposition of PM on the filter 24. Therefore, in the present embodiment, by the following principle, the amount of deposition of PM on the filter 24 is estimated based on the output of the NOx sensor 49 arranged at the downstream side of the filter 24.

Figure 5A:
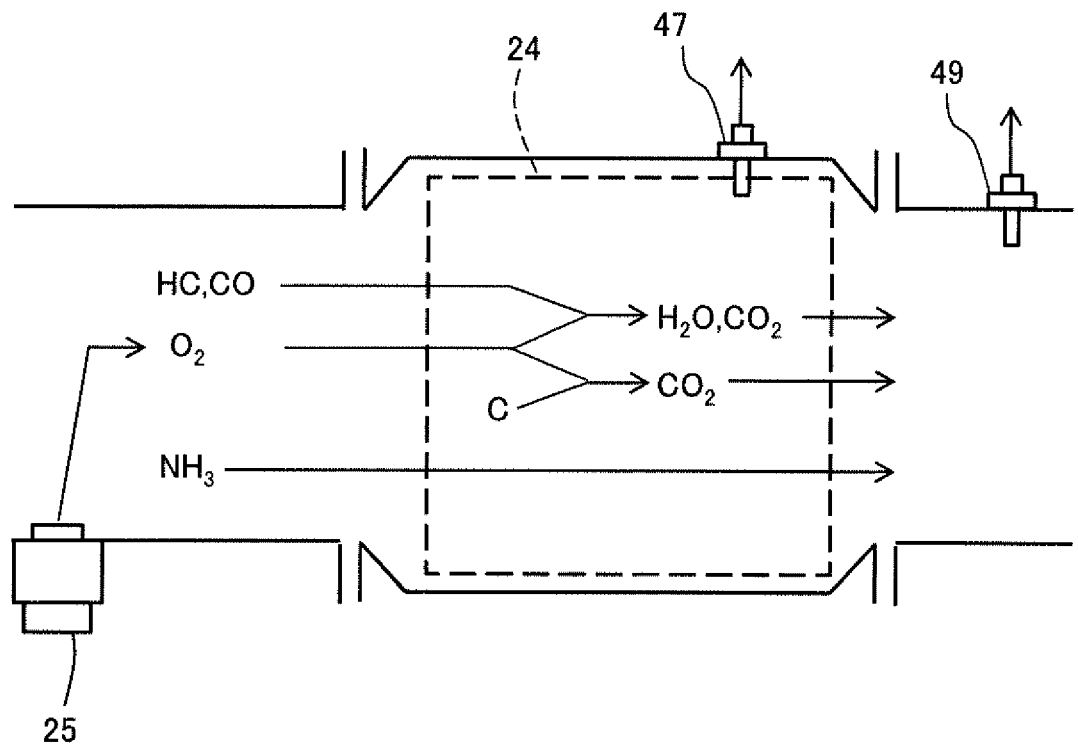
FIGS. 5A and 5B are views schematically showing a reaction occurring in the exhaust purification system when estimating the amount of deposition of PM on the filter.
Figure 5B:
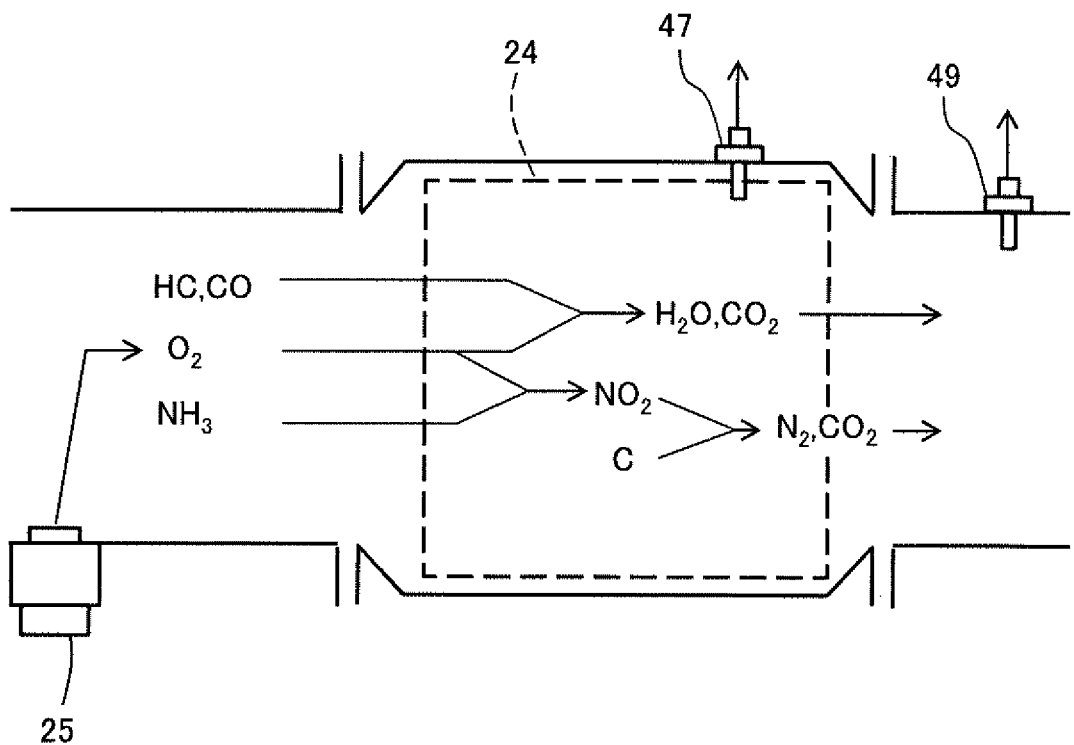

FIGS. 5A and 5B are views schematically showing the reactions occurring in the exhaust purification system when estimating the amount of deposition of PM on the filter 24. FIG. 5A shows the case where the amount of deposition of PM on the filter 24 is great, while FIG. 5B shows the case where the amount of deposition of PM on the filter 24 is small.

To estimate the amount of deposition of PM on the filter 24, preferably the time average air-fuel ratio of the exhaust gas flowing into the filter 24 over a predetermined time is maintained at substantially the stoichiometric air-fuel ratio. Below, the example where the air-fuel ratio of the exhaust gas flowing into the filter 24 is maintained at the stoichiometric air-fuel ratio will be explained.

In estimating the amount of deposition of PM, in the same way as the processing for regenerating the filter, first, the temperature of the exhaust purification catalyst 20 is raised to a temperature equal to or greater than the activation temperature thereof. Similarly, the temperature of the filter 24 is also raised up to a temperature equal to or greater than the activation temperature thereof. Specifically, the temperatures of the exhaust purification catalyst 20 and the filter 24 are made 300° C. to 700° C., preferably 400° C. to 600° C.

In addition, in estimating the amount of deposition of PM, in the same way as the processing for regenerating the filter, the amount of fuel injection from the fuel injectors 11 is controlled so that the air-fuel ratio of the exhaust gas exhausted from the engine body 1 is a rich air-fuel ratio. As a result, as explained above, exhaust gas containing ammonia flows out from the exhaust purification catalyst 20.

Furthermore, in the present embodiment, in estimating the amount of deposition of PM, secondary air is continuously fed from the secondary air feed device 25. In particular, in the present embodiment, secondary air is continuously fed from the secondary air feed device 25 so that the air-fuel ratio of the exhaust gas flowing into the filter 24 is the stoichiometric air-fuel ratio. As a result, stoichiometric air-fuel ratio exhaust gas flows into the filter 24.

However, as explained above, exhaust gas containing ammonia flows in from the exhaust purification catalyst 20. In addition, the rich air-fuel ratio exhaust gas flows out from the exhaust purification catalyst 20. Therefore, the exhaust gas flowing into the filter 24 contains not only the oxygen in the air fed from the secondary air feed device 25 but also the ammonia and unburned HC and CO in the exhaust gas flowing out from the exhaust purification catalyst 20.

As shown in FIGS. 5A and 5B, the oxygen in the exhaust gas flowing into the filter 24 reacts with the unburned HC and CO to generate water and $CO_2$. In addition, as shown in FIG. 5A, when the amount of deposition of PM on the filter 24 is great, the oxygen in the exhaust gas flowing into the filter 24 reacts preferentially with the PM (mainly comprised of carbon C) on the filter 24 than the ammonia in the exhaust gas. As a result, the ammonia in the exhaust gas flowing into the filter 24 does not react with oxygen on the filter 24 and thus flows out from the filter 24 as it is.

On the other hand, as shown in FIG. 5B, when the amount of deposition of PM on the filter 24 is small, the oxygen in the exhaust gas flowing into the filter 24 preferentially reacts with the ammonia in the exhaust gas to generate $NO_2$ by a reaction such as shown in the above formula (5). The $NO_2$ generated in this way is higher in reactivity with PM compared to oxygen, therefore is converted to $CO_2$ and $N_2$ by a reaction such as shown in the above formula (6). As a result, the ammonia in the exhaust gas flowing into the filter 24 is converted to $N_2$, therefore does not flow out from the filter 24.

Figure 6:
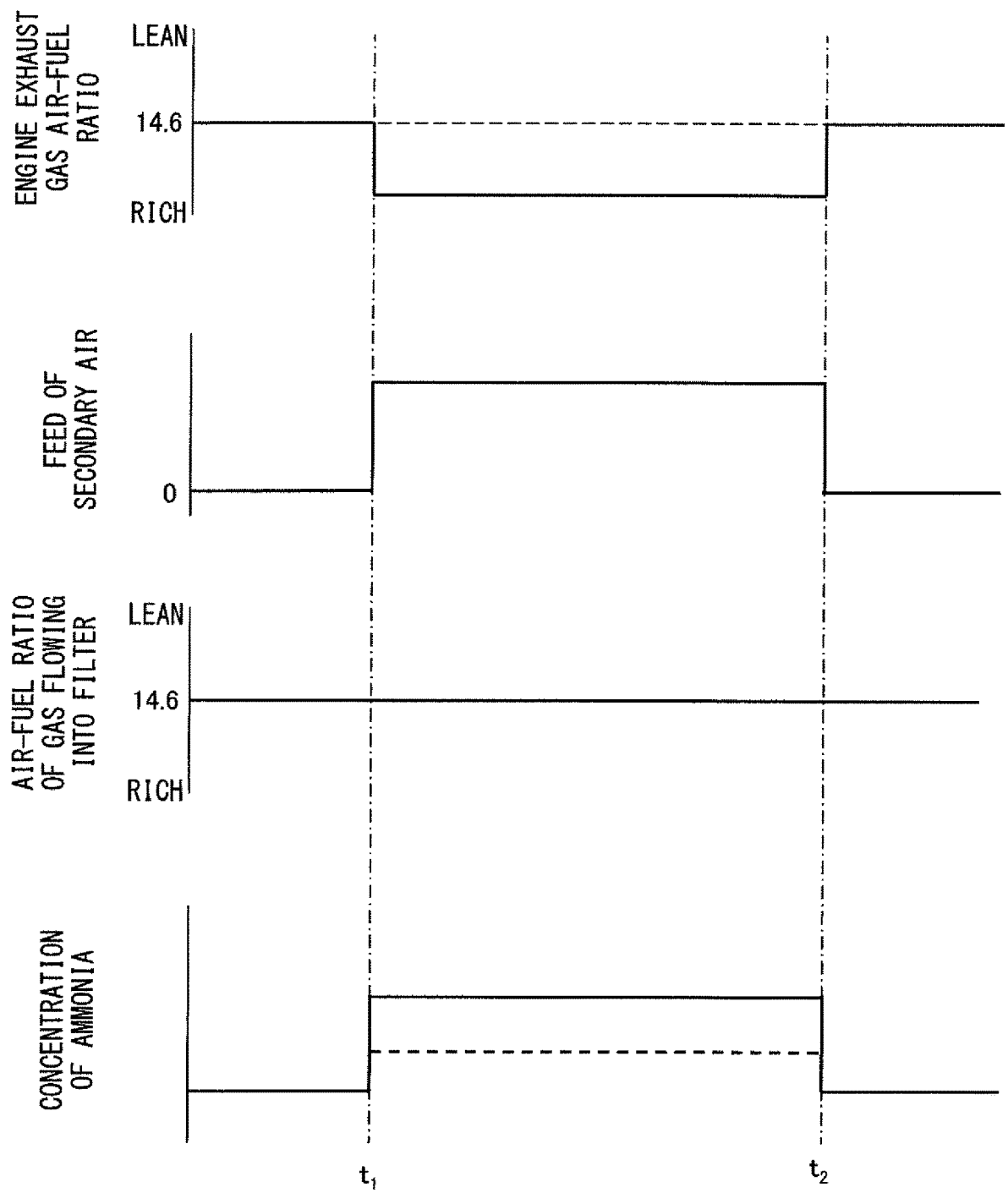
FIG. 6 is a time chart of an air-fuel ratio of exhaust gas discharged from an engine body, an amount of feed of secondary air, an air-fuel ratio of exhaust gas flowing into the filter, and a concentration of ammonia in the exhaust gas.

FIG. 6 is a time chart of the air-fuel ratio of the exhaust gas exhausted from the engine body 1, the amount of feed of secondary air from the secondary air feed device 25, the air-fuel ratio of the exhaust gas flowing into the filter 24, and the concentration of ammonia in the exhaust gas flowing out from the filter 24. Note that, the solid line in the figure shows when the amount of deposition of PM on the filter 24 is great, while the broken line in the figure shows when the amount of deposition of PM on the filter 24 is small.

In the example shown in FIG. 6, at the time $t_1$, the processing for estimating the amount of deposition of PM is started, and the air-fuel ratio of the exhaust gas exhausted from the engine body 1 is made the rich air-fuel ratio. In the present embodiment, at the same time, secondary air is fed from the secondary air feed device 25. The secondary air at this time is fed so that the air-fuel ratio of the exhaust gas flowing into the filter 24 is the stoichiometric air-fuel ratio. Therefore, the air-fuel ratio of the exhaust gas flowing into the filter 24 is maintained at the stoichiometric air-fuel ratio even after the time $t_1$.

When the amount of deposition of PM of the filter 24 is great (solid line in figure), the concentration of ammonia in the exhaust gas flowing out from the filter 24 after the time $t_1$ is higher. On the other hand, when the amount of deposition of PM of the filter 24 is small (broken line in figure), the concentration of ammonia in the exhaust gas flowing out from the filter 24 after the time $t_1$ is lower. That is, the concentration of ammonia in the exhaust gas flowing out from the filter 24 changes in accordance with the amount of deposition of PM on the filter 24. The greater the amount of deposition of PM, the higher the concentration of ammonia in the exhaust gas flowing out from the filter 24. Therefore, the amount of deposition of PM on the filter 24 is estimated by detecting the concentration of ammonia in the exhaust gas at a predetermined timing or a predetermined time period after the time $t_1$.

In the present embodiment, the concentration of ammonia in the exhaust gas flowing out from the filter 24 is detected by the NOx sensor 49. The NOx sensor 49 becomes higher in output value as the concentration of NOx in the exhaust gas becomes higher. In addition, the NOx sensor 49 is configured so that the output changes in accordance with the concentration of ammonia in the exhaust gas. In particular, it is configured so that the higher the concentration of ammonia in the exhaust gas, the higher the output value.

Further, when the amount of deposition of PM on the filter 24 is small, $NO_2$ is generated from ammonia, but the generated $NO_2$ reacts with the PM on the filter 24. Therefore, at this time, $NO_2$ does not flow out from the filter 24, therefore the output of the NOx sensor 49 basically changes in accordance with the concentration of ammonia flowing out from the filter 24.

Due to the above, according to the present embodiment, when the temperature of the exhaust purification catalyst 20 is within a predetermined temperature range of equal to or greater than the activation temperature and the air-fuel ratio of the exhaust gas discharged from the engine body 1 is the rich air-fuel ratio, the amount of deposition of PM on the filter 24 is estimated based on the output of the NOx sensor 49 when the secondary air feed device 25 continuously feeds oxygen to the filter. In other words, according to the present embodiment, when the air-fuel ratio of the exhaust gas discharged from the engine body 1 is the rich air-fuel ratio, the amount of deposition of PM on the filter 24 is estimated based on the output of the NOx sensor when the secondary air feed device 25 continuously feeds oxygen to the filter under conditions where hydrogen or ammonia is generated in the exhaust purification catalyst 20. In particular, the higher the output value of the NOx sensor 49, the greater the amount of deposition of PM on the filter 24 that is estimated.

Figure 7:
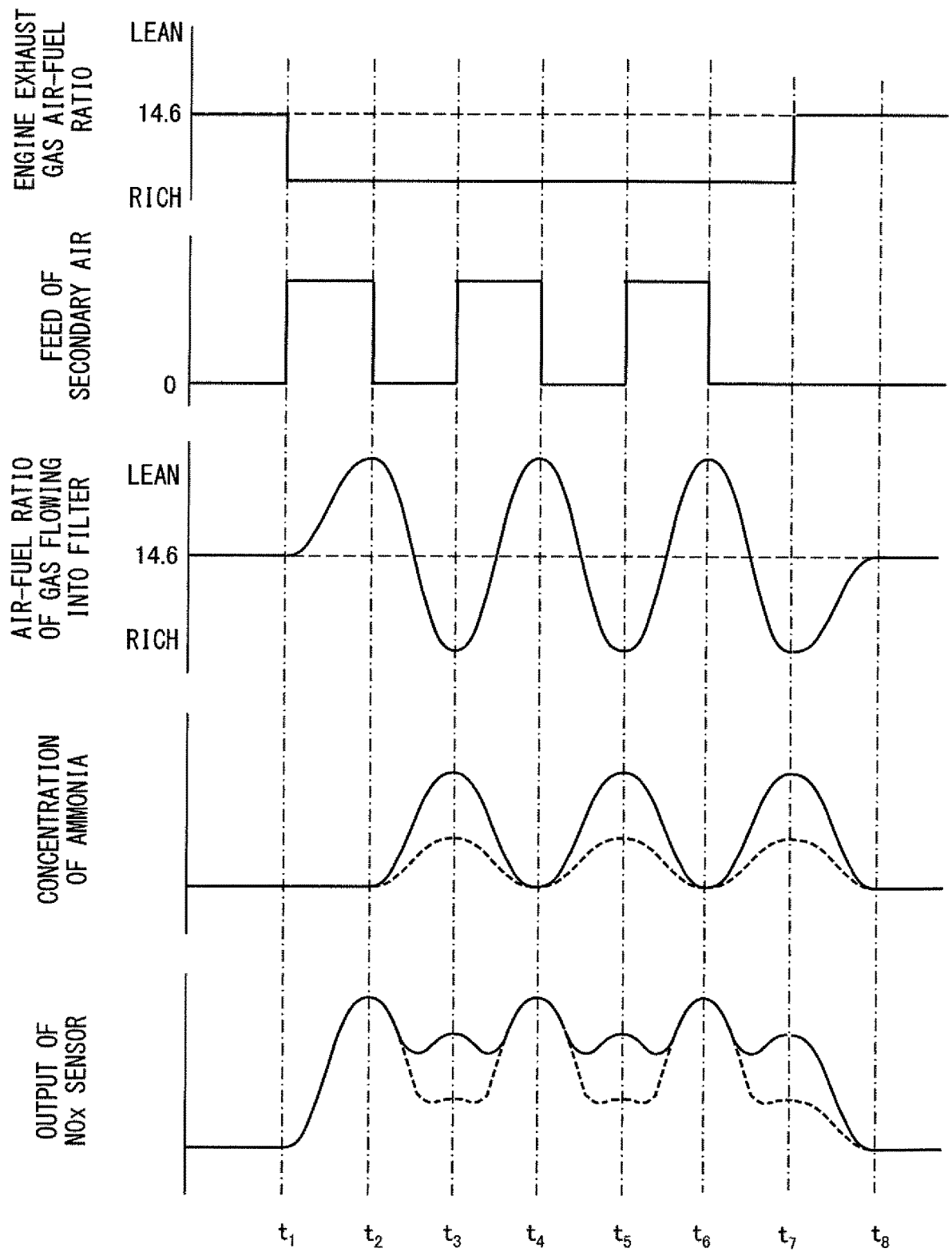
FIG. 7 is a time chart similar to FIG. 6 of the air-fuel ratio of the exhaust gas discharged from an engine body, etc.

Further, the amount of deposition of PM of the filter 24 can be estimated even if the air-fuel ratio of the exhaust gas flowing into the filter 24 is alternately changed between the rich air-fuel ratio and the lean air-fuel ratio. Below, referring to FIG. 7, the method of estimation of the amount of deposition of PM in such a case will be explained. FIG. 7 is a time chart, similar to FIG. 6, of parameters, such as the air-fuel ratio of the exhaust gas exhausted from the engine body 1. Similarly to FIG. 6, the solid line in the figure shows when the amount of deposition of PM on the filter 24 is large, while the broken line in the figure shows when the amount of deposition of PM on the filter 24 is small.

In the example shown in FIG. 7, the processing for estimating the amount of deposition of PM is started at the time $t_1$, and the air-fuel ratio of the exhaust gas exhausted from the engine body 1 is maintained at the rich air-fuel ratio. In addition, in the present embodiment, secondary air is intermittently fed from the secondary air feed device 25. As a result, the air-fuel ratio of the exhaust gas flowing into the filter 24 alternately changes between the rich air-fuel ratio and the lean air-fuel ratio.

In the example shown in FIG. 7, at the times $t_1$, $t_3$, $t_5$, the feed of secondary air is started, while at the times $t_2$, $t_4$, $t_6$, the feed of secondary air is stopped. As a result, at the times $t_2$, $t_4$, $t_6$, the lean degree of air-fuel ratio of the exhaust gas flowing into the filter 24 becomes maximum, while at the times $t_3$, $t_5$, $t_7$, the rich degree of the air-fuel ratio of the exhaust gas flowing into the filter 24 becomes maximum. Note that, in the present embodiment, secondary air is fed so that the time average air-fuel ratio of the exhaust gas flowing into the filter 24 over several cycles becomes the stoichiometric air-fuel ratio.

In this regard, as explained above, the rich air-fuel ratio exhaust gas and the lean air-fuel ratio exhaust gas, which alternately flow into the filter 24, mix together to a certain extent in the filter 24. Therefore, the rich air-fuel ratio exhaust gas flowing into the filter 24 also contains a certain extent of oxygen in the filter 24 and the lean air-fuel ratio exhaust gas flowing into the filter 24 contains a certain amount of ammonia in the filter 24.

For this reason, even if the air-fuel ratio of the exhaust gas flowing into the filter 24 is a rich air-fuel ratio, when the amount of deposition of PM on the filter 24 is large, the oxygen in the exhaust gas reacts with the PM. On the other hand, when the amount of deposition of PM on the filter 24 is small, the oxygen in the exhaust gas reacts with ammonia to generate $NO_2$. The generated $NO_2$ reacts with the PM. Therefore, if the air-fuel ratio of the exhaust gas flowing into the filter 24 is a rich air-fuel ratio, the concentration of ammonia in the exhaust gas flowing out from the filter 24 changes according to the amount of deposition of PM on the filter 24. Therefore, by detecting the concentration of ammonia in the exhaust gas when the air-fuel ratio of the exhaust gas flowing into the filter 24 is a rich air-fuel ratio, it is possible to estimate the amount of deposition of PM on the filter 24.

On the other hand, if the air-fuel ratio of the exhaust gas flowing into the filter 24 is a lean air-fuel ratio, the NO contained in the exhaust gas flowing out from the exhaust purification catalyst 20 (rich air-fuel ratio exhaust gas flows into the exhaust purification catalyst 20, therefore only a small amount of NO is discharged from the exhaust purification catalyst 20) is not removed at the filter 24. As a result, NOx flows out from the filter 24 and the output value of the NOx sensor 49 becomes larger.

Due to the above, according to the present embodiment, if the temperature of the exhaust purification catalyst 20 is within a predetermined temperature range of equal to or greater than the activation temperature and the air-fuel ratio of the exhaust gas discharged from the engine body 1 is a rich air-fuel ratio, the amount of deposition of PM on the filter 24 is estimated based on the output of the NOx sensor 49 when intermittently feeding oxygen from the secondary air feed device 25 to the filter 24. In other words, according to the present embodiment, under conditions where hydrogen or ammonia is generated at the exhaust purification catalyst 20 when the air-fuel ratio of the exhaust gas discharged from the engine body 1 is a rich air-fuel ratio, the amount of deposition of PM on the filter 24 is estimated based on the output of the NOx sensor 49 when oxygen is intermittently fed from the secondary air feed device 25 to the filter 24. In particular, the higher the output value of the NOx sensor 49, the greater the amount of deposition of PM on the filter 24 that is estimated.

As explained above, if the air-fuel ratio of the exhaust gas discharged from the engine body 1 is a rich air-fuel ratio and secondary air is being fed into the exhaust gas, if the amount of deposition of PM on the filter 24 changes, the concentration of ammonia in the exhaust gas flowing out from the filter 24 changes. According to the present embodiment, in this case, the concentration of ammonia in the exhaust gas flowing out from the filter 24 is detected, and based on the detected concentration the amount of deposition of PM is estimated. Therefore, according to the present embodiment, a method different from the past may be used to estimate the amount of deposition of PM on the filter 24.

Note that, in the above embodiment, a NOx sensor is provided at the downstream side of the filter 24, in the direction of flow of exhaust. However, as long as a detection device changes in output according to the concentration of ammonia in the exhaust gas, an ammonia sensor or other detection device may also be used.

In particular, as such a sensor, it is preferable to use an ammonia sensor changing in output value according to the concentration of ammonia, but not changing in output value according to the concentration of NOx. The NOx contained in the exhaust gas discharged from the engine body 1 basically is removed at the exhaust purification catalyst 20 or the filter 24, but if part of the NOx remains without being removed, when detecting the concentration of ammonia by the NOx sensor, the remaining NOx has an effect on the output value of the NOx sensor. As a result, error occurs in the estimation of the concentration of ammonia. As opposed to this, if using an ammonia sensor instead of the NOx sensor 49, the effect of NOx in the exhaust gas can be removed and accordingly the amount of deposition of PM can be more accurately estimated.

<<Specific Control>>

Figure 8:
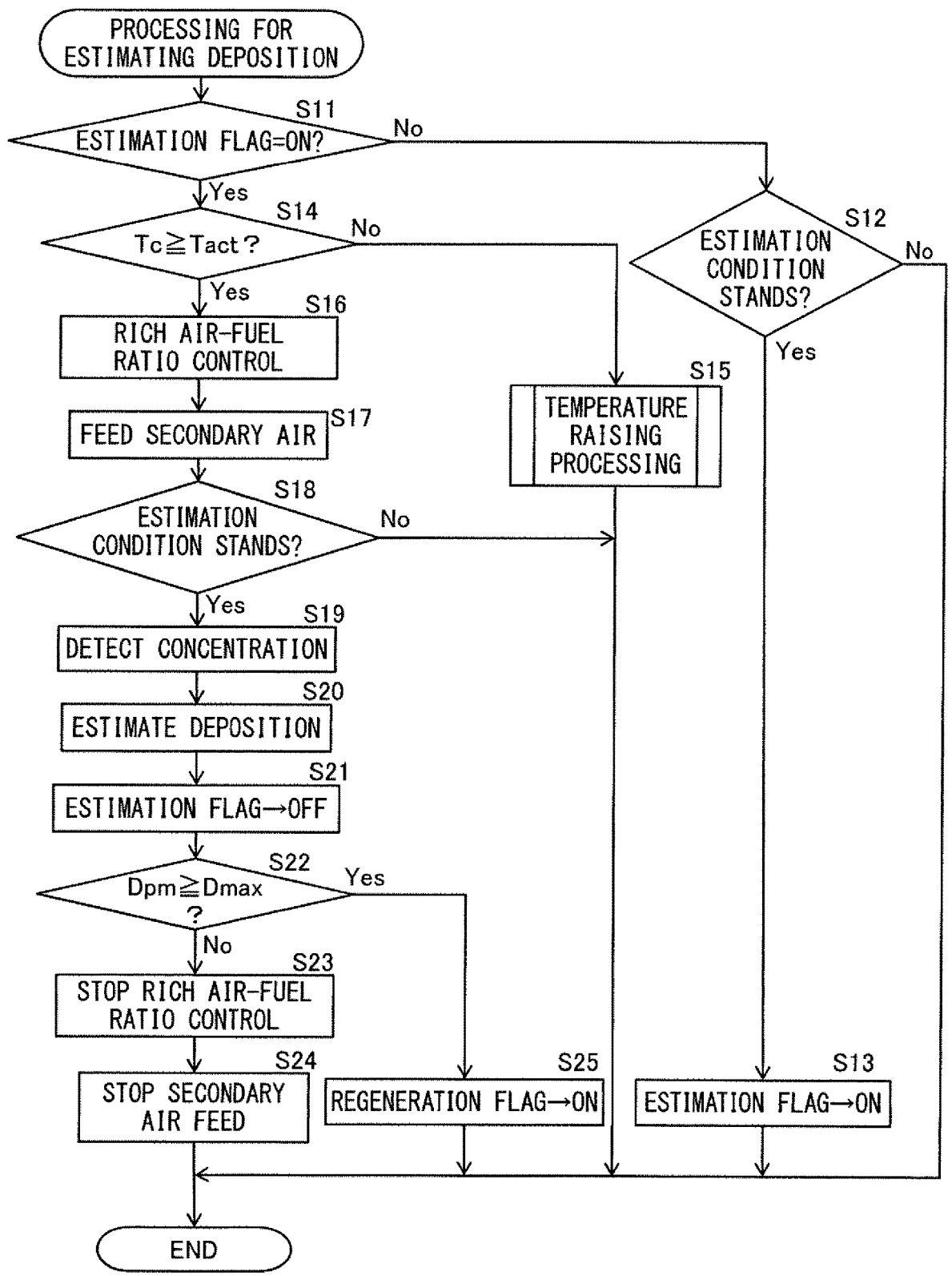
FIG. 8 is a flow chart showing a control routine of processing for estimating the amount of deposition according to an embodiment.

Next, referring to FIG. 8, the specific control in processing for estimating the amount of deposition according to the present embodiment will be explained. FIG. 8 is a flow chart showing a control routine of processing for estimating the amount of deposition according to the present embodiment. The illustrated control routine is performed every certain time interval.

First, at step S11, it is judged if the estimation flag is ON. The estimation flag is a flag which is set ON when the processing for estimating the amount of deposition of the filter 24 is being performed and is set OFF otherwise. At step S11, if it is judged that the estimation flag is OFF, the routine proceeds to step S12.

At step S12, it is judged if the condition for performing the processing for estimating the amount of deposition of the filter 24 stands. The condition for performing the processing for estimating the amount of deposition stands, for example, each time the operating time of the internal combustion engine reaches a predetermined operating time. Alternatively, the condition for performing the processing for estimating the amount of deposition stands, for example, every time the driving distance of the vehicle mounting the internal combustion engine reaches a certain distance. Due to this, the processing for estimating the amount of deposition of the filter 24 is performed at certain driving time intervals or certain driving distance intervals.

Further, the differential pressure sensor 48 can also be used to estimate the amount of deposition of PM on the filter 24, but the accuracy of estimation of the amount of deposition according to the differential pressure sensor 48 is not that high. Therefore, when the differential pressure detected by the differential pressure sensor 48 is high to a certain degree, it is also possible to perform the processing for estimating the amount of deposition of the present embodiment. In this case, the condition for performing processing for estimating the amount of deposition stands in the case where the differential pressure between forward and backward of the filter 24 detected by the differential pressure sensor 48 is larger than a predetermined limit differential pressure.

If at step S12 it is judged that the condition for performing the processing for estimating the amount of deposition does not stand, the control routine is ended. On the other hand, if at step S12 it is judged that the condition for performing the processing for estimating the amount of deposition stands, the routine proceeds to step S13. At step S13, the estimation flag is set ON and the control routine is ended.

If the estimation flag is set ON, at the next control routine, the routine proceeds from step S1 to step S14. At step S14, it is judged if the temperature Tc of the exhaust purification catalyst 20 and the filter 24 is equal to or greater than the activation temperature Tact (for example, 300° C.). The temperatures of the exhaust purification catalyst 20 and the filter 24 are respectively detected by the catalyst temperature sensor 46 and the filter temperature sensor 47.

As explained above, if the temperature Tc of the exhaust purification catalyst 20 is less than the activation temperature Tact, it is not possible to generate hydrogen or ammonia at the exhaust purification catalyst 20. Further, if the temperature of the filter 24 is less than the activation temperature Tact, almost no reaction occurs between ammonia or PM and oxygen. Therefore, if at step S14 it is judged that the temperatures of the exhaust purification catalyst 20 and the filter 24 is less than the activation temperature Tact, the routine proceeds to step S15 where processing for raising the temperatures of the exhaust purification catalyst 20 and the filter 24 is performed.

The processing for raising the temperature of the exhaust purification catalyst 20 at step S15 includes, for example, dither control in which the air-fuel ratio of the air-fuel mixture fed to the combustion chambers 5 is set to the rich air-fuel ratio in some of the cylinders of the plurality of cylinders and the air-fuel ratio of the air-fuel mixture fed to the combustion chambers 5 is set to the lean air-fuel ratio in the remaining cylinders. In the case of performing dither control, the exhaust gas containing unburned HC and CO exhausted from rich air-fuel ratio cylinders and the exhaust gas containing a large amount of oxygen exhausted from lean air-fuel ratio cylinders are mixed together and react on the exhaust purification catalyst 20. For this reason, due to the heat of reaction at this time, the exhaust purification catalyst 20 is raised in temperature. Further, at this time, due to the heat transmitted to the exhaust gas, the filter 24 is raised in temperature. Note that, in the processing of raising the temperatures of the exhaust purification catalyst 20 and the filter 24, instead of dither control, existing temperature raising control other than dither control can be used.

If, due to the processing for raising the temperatures of the exhaust purification catalyst 20 and the filter 24, the temperature Tc of the exhaust purification catalyst 20 and the filter 24 rises to equal to or greater than the activation temperature Tact, at the next control routine, the routine proceeds from step S14 to step S16. At step S16, the amount of fuel injection from the fuel injector 11 is controlled in rich air-fuel ratio control so that the air-fuel ratio of the exhaust gas exhausted from the engine body 1 is the rich air-fuel ratio. The target air-fuel ratio at this time is, for example, 13.6.

Next, at step S17, the secondary air feed device 25 is used to continuously feed secondary air. The amount of feed of secondary air is set so that air-fuel ratio of the exhaust gas flowing into the filter 24 becomes the stoichiometric air-fuel ratio.

Next, at step S18, it is judged if the condition for estimation stands. The condition for estimation, for example, stands if the time or the flow rate of the exhaust gas, from when the injection of fuel starts from the fuel injector 11 so that the air-fuel ratio of the exhaust gas exhausted from the engine body 1 is the rich air-fuel ratio, becomes equal to or greater than a predetermined first predetermined value and the time or the flow rate of the exhaust gas, from when the feed of secondary air starts, becomes equal to or greater than a predetermined second predetermined value. Due to this, the estimation is performed after the exhaust gas flowing into the filter 24 stably becomes the stoichiometric air-fuel ratio.

If at step S18 it is judged that the condition for estimation does not stand, the control routine is ended. On the other hand, if at step S18 it is judged that the condition for estimation stands, the routine proceeds to step S19. At step S19, the concentration of ammonia in the exhaust gas flowing out from the filter 24 is detected by the NOx sensor 49. Next, at step S20, the amount of deposition of PM on the filter 24 is estimated based on the concentration of ammonia estimated at step S19. Note that, in the present embodiment, the amount of deposition of PM is estimated based on the one detected value of the NOx sensor 49. However, it is also possible to estimate the amount of deposition of PM based on the average value of a plurality of detection values. Next, at step S21, the estimation flag is set to OFF.

Next, at step S22, it is judged if the amount of deposition Dpm of PM estimated at step S20 is equal to or greater than the above-mentioned limit deposition amount Dmax. If it is estimated that the amount of deposition Dpm of PM is less than the limit deposition amount Dmax, the routine proceeds to step S23. At step S23, the rich air-fuel ratio control is stopped and the air-fuel ratio of the exhaust gas exhausted from the engine body 1 is set to the air-fuel ratio at the time of normal driving (for example, maintained near the stoichiometric air-fuel ratio). Next, at step S24, the feed of secondary air from the secondary air feed device 25 is stopped and the control routine is ended.

On the other hand, if at step S22 it is judged that the amount of deposition Dpm of PM is equal to or greater than the limit deposition amount Dmax, the routine proceeds to step S25 where the regeneration flag is set ON and the control routine is ended. The regeneration flag is a flag which is set ON when the filter is being regenerated and is set OFF when otherwise.

Figure 9:
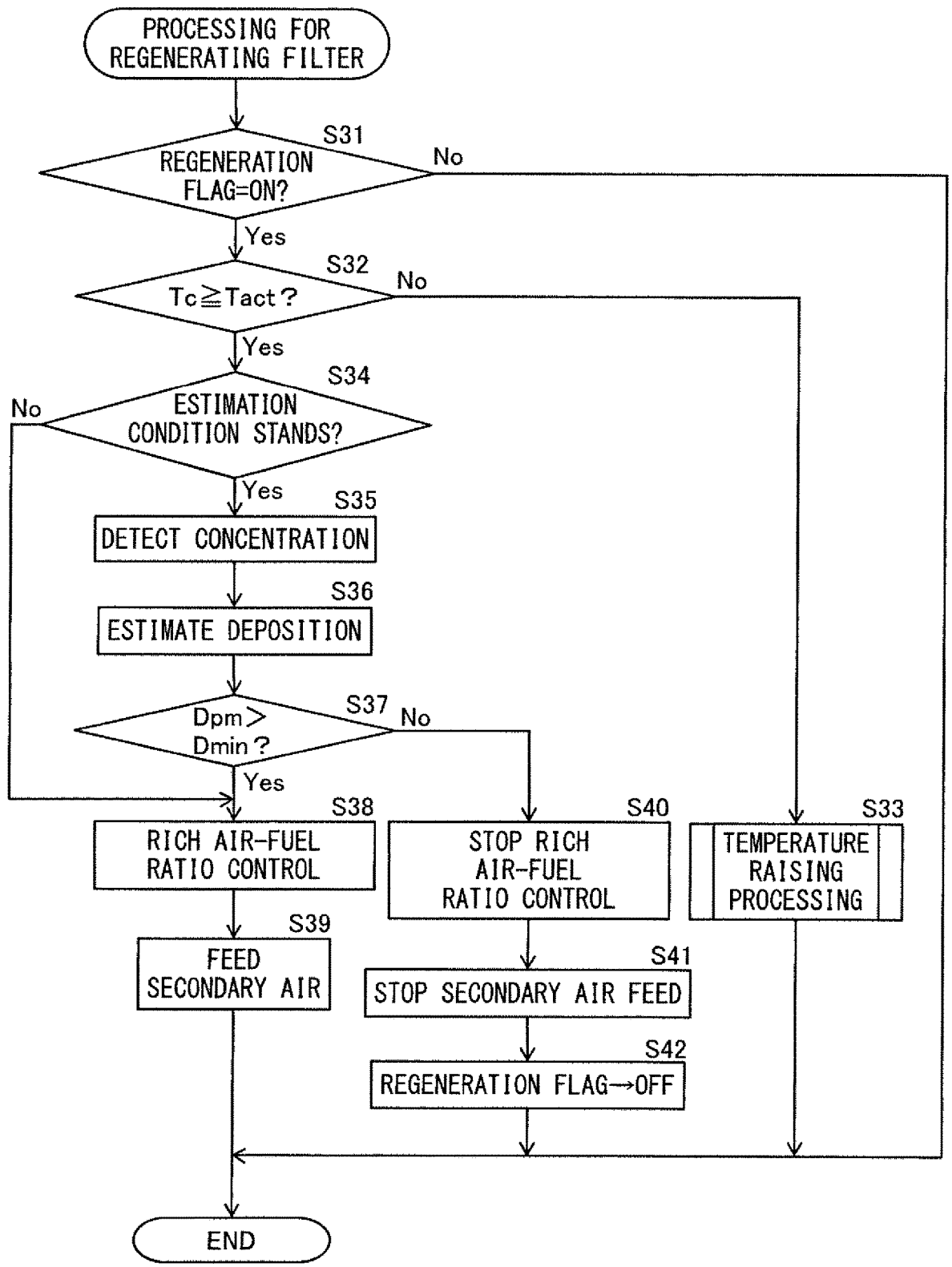
FIG. 9 is a flow chart showing a control routine of processing for regenerating a filter according to an embodiment.

Next, referring to FIG. 9, the specific control in the processing for regenerating the filter according to the present embodiment will be explained. FIG. 9 is a flow chart showing a control routine of the processing for regenerating the filter according to the present embodiment. The illustrated control routine is performed every certain time interval.

First, at step S31, it is judged if the regeneration flag has become ON. The regeneration flag is set ON at step S25 of FIG. 8. If at step S31 it is judged that the regeneration flag is set OFF, the control routine is ended. On the other hand, if it is judged that the regeneration flag is set ON, the routine proceeds to step S32.

At step S32, it is judged if the temperature Tc of the exhaust purification catalyst 20 and the filter 24 is equal to or greater than the activation temperature Tact (for example, 300° C.). If at step S32 it is judged that the temperatures of the exhaust purification catalyst 20 and the filter 24 are less than the activation temperature Tact, the routine proceeds to step S33 where, in the same way as step S15 of FIG. 8, the processing for raising the temperatures of the exhaust purification catalyst 20 and the filter 24 is performed. On the other hand, if at step S32 it is judged that the temperatures of the exhaust purification catalyst 20 and the filter 24 are equal to or greater than the activation temperature Tact, the routine proceeds to step S34.

At step S34, it is judged whether the condition for estimation for estimating the amount of deposition of PM on the filter 24 stands. The condition for estimation at step S34, for example, stands when the air-fuel ratio of the exhaust gas flowing into the filter 24 is the stoichiometric air-fuel ratio or the rich air-fuel ratio and does not stand when it is the lean air-fuel ratio. Due to this, the condition for estimation stands only if it is possible to estimate the amount of deposition of PM based the output of the NOx sensor 49.

If it is judged at step S34 that the condition for estimation does not stand, steps S35 to S37 are skipped. On the other hand, if at step S34 it is judged that the condition for estimate stands, the routine proceeds to step S35. At step S35, in the same way as step S19, the concentration of ammonia in the exhaust gas flowing out from the filter 24 is detected by the NOx sensor 49. Next, at step S36, in the same way as step S20, the amount of deposition of PM on the filter 24 is estimated based on the concentration of ammonia estimated at step S35.

Next, at step S37, it is judged if the amount of deposition Dpm of PM estimated at step S36 is greater than the regeneration end amount Dmin. The regeneration end amount Dmin is a certain predetermined value close to zero.

If at step S37 it is judged that the amount of deposition Dpm of PM is greater than the regeneration end amount Dmin, the routine proceeds to step S38. At step S38, rich air-fuel ratio control is performed so that the air-fuel ratio of the exhaust gas exhausted from the engine body 1 is a rich air-fuel ratio. Next, at step S39, secondary air is intermittently fed from the secondary air feed device 25. The period of feed and amount of feed of secondary air are set so that the air-fuel ratio of the exhaust gas flowing into the filter 24 fluctuates as shown in FIG. 7.

After that, if the amount of deposition Dpm of PM decreases and becomes equal to or less than the regeneration end amount Dmin, at the next control routine, the routine proceeds from step S37 to step S40. At step S40, rich air-fuel ratio control is stopped and the air-fuel ratio of the exhaust gas exhausted from the engine body 1 is set to the air-fuel ratio at the time of normal operation (for example, maintained near the stoichiometric air-fuel ratio). Next, at step S41, the feed of secondary air from the secondary air feed device 25 is stopped. Next, at step S42, the regeneration flag is set to OFF and the control routine is ended.

Second Embodiment

Next, referring to FIGS. 10 and 11, an exhaust purification system of an internal combustion engine according to a second embodiment will be explained. The configuration and control of the exhaust purification system according to the second embodiment are basically similar to the configuration and control of the exhaust purification system according to the first embodiment. Therefore, below, the parts different from the configuration and control of the exhaust purification system according to the first embodiment will primarily be explained.

In the above first embodiment, processing for regenerating the filter was performed while the vehicle mounting the internal combustion engine was being driven. However, the processing for regenerating the filter may also be performed at a service shop, etc. In this case, the vehicle is provided with a warning light (not shown) for providing a warning to the driver that the processing for regenerating the filter is necessary. This warning light is connected through a drive circuit 45 to the output port of the ECU 31. The warning light is turned on when the detected amount of deposition of PM of the filter 24 is equal to or greater than the limit deposition amount.

In this case, the exhaust purification system of the internal combustion engine need not be provided with the secondary air feed device 25, as long as the exhaust pipe 22 is provided with an opening (not shown) for attachment of the secondary air feed device. When performing the processing for regenerating the filter, a cover attached to the opening of the exhaust pipe 22 is detached at the service shop, the secondary air feed device is attached to this opening, and this secondary air feed device is connected to the output port of the ECU. After that, the processing for regenerating the filter is performed.

Figure 10:
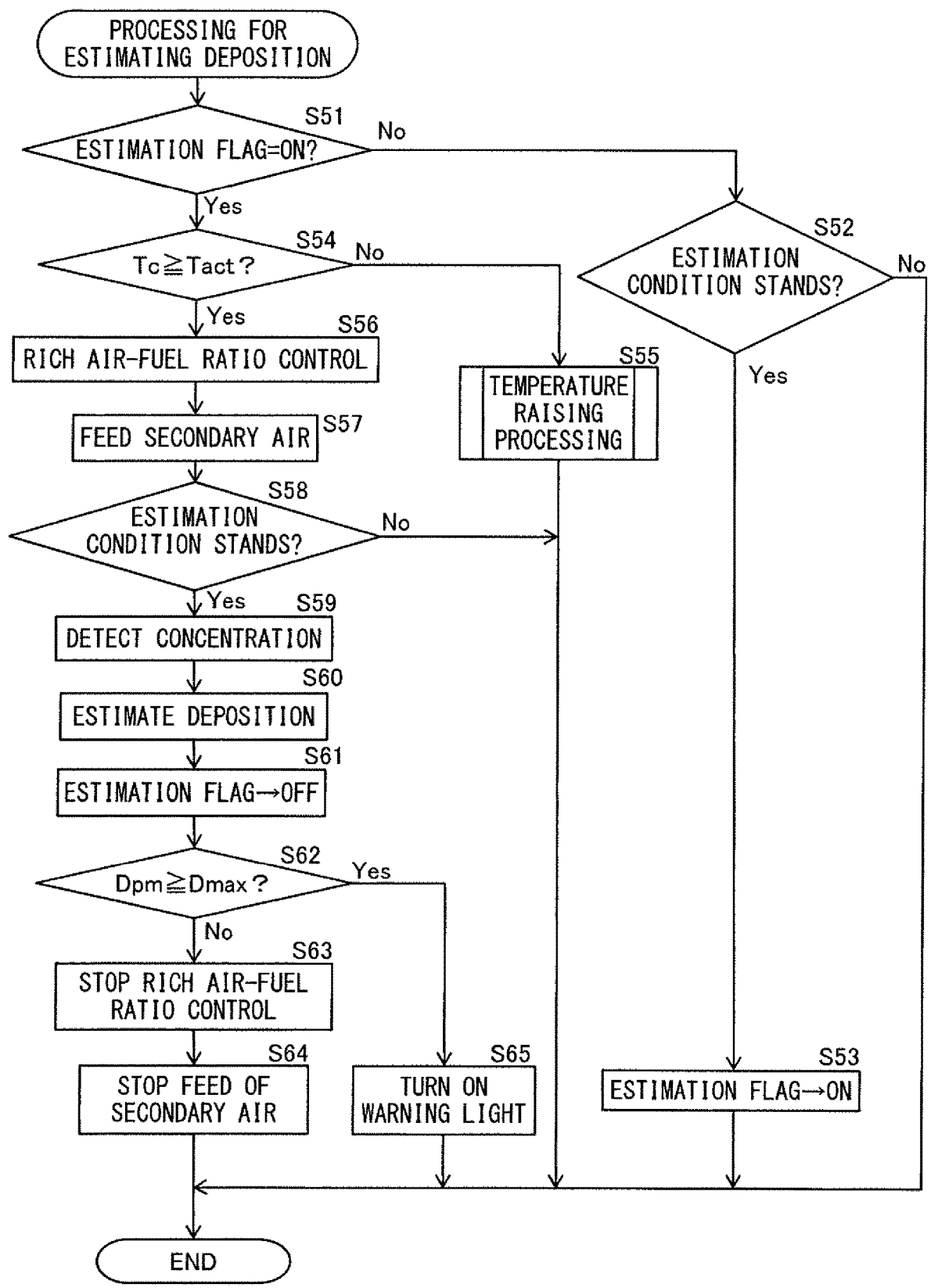
FIG. 10 is a flow chart showing a control routine of processing for estimating the amount of deposition according to a second embodiment.

FIG. 10 is a flow chart showing a control routine of processing for estimating the amount of deposition according to the second embodiment. The illustrated control routine is performed every certain time interval. Steps S51 to S64 of FIG. 10 are similar to steps S11 to S24 of FIG. 8, therefore explanations will be omitted.

If at step S62 it is judged that the amount of deposition Dpm of PM is equal to or greater than the limit deposition amount Dmax, the routine proceeds to step S65. At step S65, a warning light showing that processing for regenerating the filter 24 is necessary is turned on and then the control routine is ended.

Figure 11:
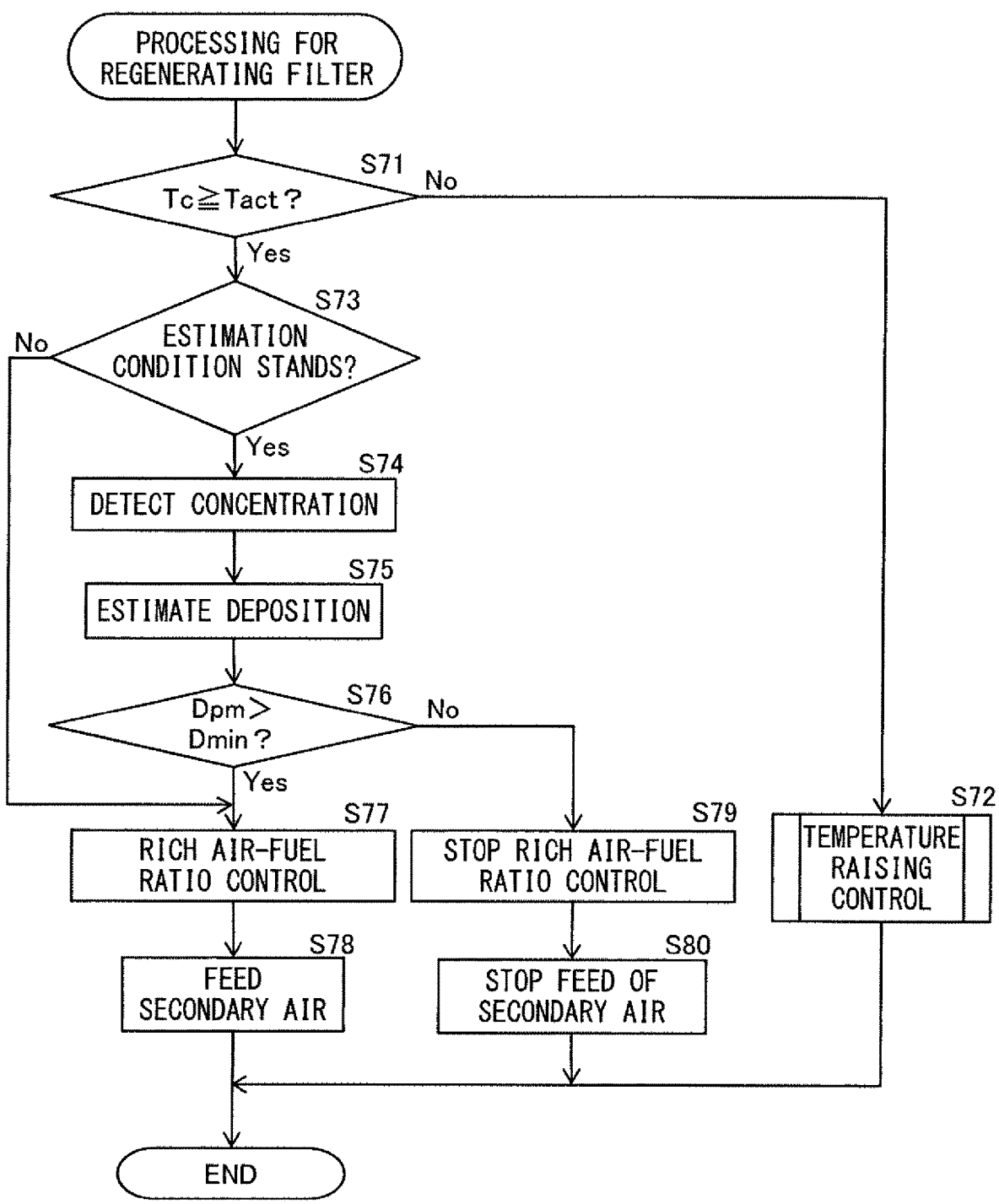
FIG. 11 is a flow chart showing a control routine of processing for regenerating a filter according to a second embodiment.

FIG. 11 is a flow chart showing a control routine of the processing for regenerating the filter according to the second embodiment. The illustrated control routine is, for example, performed every certain time interval after a secondary air feed device 25 is attached to the opening of the exhaust pipe 22 at a service shop.

First, at step S71, it is judged if the temperature Tc of the exhaust purification catalyst 20 is equal to or greater than the activation temperature Tact. If less than the activation temperature Tact, the routine proceeds to step S72 where processing is performed to raise the temperatures of the exhaust purification catalyst 20 and the filter 24. The processing for raising the temperatures of the exhaust purification catalyst 20 and the filter 24 may be performed in the same way as step S15 of FIG. 8. Alternatively, for example, it may be performed by attaching an electric heater around the exhaust purification catalyst 20 and the filter 24 and supplying electric power to this electric heater.

After that, if the temperature Tc of the exhaust purification catalyst 20 and the filter 24 rises to equal to or greater than the activation temperature Tact, at the next control routine, the routine proceeds from step S71 to step S73. Step S73 to S80 are basically similar to steps S34 to S41 of FIG. 9, therefore explanations will be omitted.

REFERENCE SIGNS LIST 1. engine body
5. combustion chamber
11. fuel injector
20. exhaust purification catalyst
25. secondary air feed device
24. particulate filter (filter)
31. electronic control unit (ECU)
46. catalyst temperature sensor
47. filter temperature sensor
48. differential pressure sensor

The invention claimed is:

1. An exhaust purification system of an internal combustion engine, comprising:
an exhaust purification catalyst arranged in an exhaust passage of the internal combustion engine and having a catalytic function;
a particulate filter arranged in the exhaust passage at a downstream side from the exhaust purification catalyst in a direction of flow of exhaust;
an oxygen feed device feeding gas containing oxygen into exhaust gas flowing into the particulate filter at the downstream side from the exhaust purification catalyst in the direction of flow of exhaust;
a detection device changing in output according to a concentration of ammonia in exhaust gas flowing out from the particulate filter; and
a control device controlling the oxygen feed device and estimating an amount of deposition of particulate matter on the particulate filter,
wherein the control device is configured to control the oxygen feed device so as to continuously or intermittently feed oxygen from the oxygen feed device to the particulate filter if a temperature of the exhaust purification catalyst is in a predetermined temperature range of equal to or greater than an activation temperature and an air-fuel ratio of exhaust gas discharged from a body of the internal combustion engine is a rich air-fuel ratio richer than a stoichiometric air-fuel ratio, and estimate the amount of deposition of particulate matter on the particulate filter based on the output of the detection device when feeding oxygen.

2. The exhaust purification system of the internal combustion engine according to claim 1, wherein the predetermined temperature range is 400° C. to 600° C.

3. The exhaust purification system of the internal combustion engine according to claim 1, wherein the control device makes the oxygen feed device feed air so that a time average air-fuel ratio of exhaust gas flowing into the particulate filter is the stoichiometric air-fuel ratio, when estimating the amount of deposition of particulate matter on the particulate filter.

4. The exhaust purification system of the internal combustion engine according to claim 1, wherein the control device makes the oxygen feed device continuously feed oxygen so that an average air-fuel ratio of exhaust gas flowing into the particulate filter is continuously the stoichiometric air-fuel ratio, when estimating the amount of deposition of particulate matter on the particulate filter.

5. The exhaust purification system of the internal combustion engine according to claim 1, wherein the control device makes the oxygen feed device feed air in the exhaust gas so that the air-fuel ratio of the exhaust gas flowing into the particulate filter alternately changes between the rich air-fuel ratio and a lean air-fuel ratio leaner than the stoichiometric air-fuel ratio and so that an average air-fuel ratio over time of exhaust gas flowing into the particulate filter is the stoichiometric air-fuel ratio, when estimating the amount of deposition of particulate matter on the particulate filter.

6. The exhaust purification system of the internal combustion engine according to claim 1, wherein the detection device is a NOx sensor detecting NOx in the exhaust gas, which is configured to change in output in accordance with a concentration of NOx as well as the concentration of ammonia in the exhaust gas.

7. The exhaust purification system of the internal combustion engine according to claim 1, wherein the control device removes particulate matter deposited on the particulate filter as processing for regenerating the particulate filter, when the amount of deposition of particulate matter on the particulate filter is equal to or greater than a predetermined amount.

8. An exhaust purification system of an internal combustion engine, comprising:
an exhaust purification catalyst arranged in an exhaust passage of the internal combustion engine and having a catalytic function;
a particulate filter arranged in the exhaust passage at a downstream side from the exhaust purification catalyst in a direction of flow of exhaust;
an oxygen feed device feeding gas containing oxygen into exhaust gas flowing into the particulate filter at the downstream side from the exhaust purification catalyst in the direction of flow of exhaust;
a detection device changing in output according to a concentration of ammonia in exhaust gas flowing out from the particulate filter; and
a control device controlling the oxygen feed device and estimating an amount of deposition of particulate matter on the particulate filter,
wherein the control device is configured to control the oxygen feed device so as to continuously or intermittently feed oxygen from the oxygen feed device to the particulate filter under conditions in which, when an air-fuel ratio of exhaust gas exhausted from a body of the internal combustion engine is a rich air-fuel ratio richer than a stoichiometric air-fuel ratio, hydrogen or ammonia is generated at the exhaust purification catalyst, and estimate the amount of deposition of particulate matter on the particulate filter based on the output of the detection device when feeding oxygen.

* * * * *